Oct. 22, 1957    L. E. VAN DER GRINTEN    2,810,331
APPARATUS FOR CARRYING OUT A TRANSFER PROCESS
Filed May 10, 1954    5 Sheets-Sheet 1

By- Lodewijk Evert van der Grinten
Pollard, Johnston, Smythe & Robertson

Oct. 22, 1957 L. E. VAN DER GRINTEN 2,810,331
APPARATUS FOR CARRYING OUT A TRANSFER PROCESS
Filed May 10, 1954 5 Sheets-Sheet 3

By Lodewijk Evert van der Grinten
Pollard, Johnston, Smythe & Robertson

Oct. 22, 1957     L. E. VAN DER GRINTEN     2,810,331
APPARATUS FOR CARRYING OUT A TRANSFER PROCESS
Filed May 10, 1954                      5 Sheets-Sheet 5

By Lodewijk Evert van der Grinten
Pollard, Johnston, Smythe & Robertson

United States Patent Office 2,810,331
Patented Oct. 22, 1957

2,810,331

APPARATUS FOR CARRYING OUT A TRANSFER PROCESS

Lodewijk Evert van der Grinten, Venlo, Netherlands, assignor to Chemische Fabriek L. van der Grinten N. V., Venlo, Netherlands, a company of the Netherlands Application May 10, 1954, Serial No. 428,571

Claims priority, application Netherlands May 8, 1953

9 Claims. (Cl. 95—89)

The invention is concerned with apparatus for carrying out a transfer process of the kind in which, with the co-operation of a liquid for assisting the transfer, imagewise-exposed light sensitive sheet material is pressed against receiving support material by means of co-operating press rollers, in the pressing zone of which the two materials are pressed together. An apparatus of this kind comprises the said press rollers, a liquid reservoir, and means for conveying at least one of the materials through said liquid reservoir. At least one of the press rollers also acts as a transport roller, and is immersed in the liquid reservoir over an area of its surface extending in the direction of rotation in front of the pressing zone and co-operating with an endless belt system travelling close thereto in said area.

An apparatus of this kind is known from the Swiss patent specification No. 240,472, which apparatus is especially designed for carrying out the process described in said specification, in which the two materials are immersed in a liquid for a very short time only, and are subsequently pressed together and kept in this compressed condition between a roller and an endless conveyor belt. They remain for some time in this condition before they reach the final pressing zone, through which they pass together with the endless belt itself.

With more up-to-date transfer processes, for example those of the United States patent applications Serial Nos. 341,197 and 341,198, which are based upon "bodily transfer", a different procedure often has to be followed, i. e. a procedure which is to some extent the reverse of that aimed at by the apparatus of Swiss patent specification No. 240,472. In a number of these modern transfer processes it is desirable first to contact one or both materials separately for a somewhat longer time with a liquid and only then to bring them into contact and press them together. The apparatus according to Swiss specification No. 240,472 is obviously not suitable for carrying out these modern transfer processes because in this it is not possible either to bring one of the materials into contact with the liquid for some time, independently of the other material, or to feed each of the co-operating materials separately to the pressing zone in such a way that these materials meet after prolonged contact with the liquid without previously having had any appreciable contact with each other.

The apparatus according to the invention makes it possible to give the materials a treatment as referred to. It is characterized in that the endless belt system ends (in the direction of movement of the co-operating roller) in front of the pressing zone. Thus the pressing zone remains accessible from one side for the feeding of sheet- or web-shaped material along at least two separate paths. At least one of these paths extends between a transport press roller and an associated endless belt system. This means that the endless belt system turns into its own return path before having reached the pressing zone, while—as stated—the pressing zone should be accessible for the feeding of sheet or web-shaped material otherwise than through the said co-operating system of transport press roller and endless belt system.

When there is some space between the immersed press roller and the associated endless belt system the liquid may freely enter into this space and wet the guided material. In this case the endless belt system must be driven separately from the driving of the associated press roller. However, in a preferred embodiment of the apparatus according to the invention the endless belt system travels in contact with the associated transport press roller. It may thus be driven by the transport press roller.

Inasmuch as the endless belt system is not itself capable of carrying on its surface the necessary liquid for the liquid treatment and of supplying it to the sheet, it is necessary to give it an open-work structure, so as to allow the liquid from the liquid reservoir to penetrate it at least in several places of the working surface of the system.

In order to obtain a favorable arrangement of the combination of press rollers and of the paths to be traversed by the material, the angle between the tangent plane through the pressing zone and the horizontal plane is preferably between 30° and 90°.

Various forms of the invention are illustrated in the accompanying drawings, in which:

Figure 8 relates more particularly to an apparatus for making sheet-shaped and web-shaped materials co-operate for transfer.

In the drawings, identical reference numbers refer to identical parts.

Figure 1:
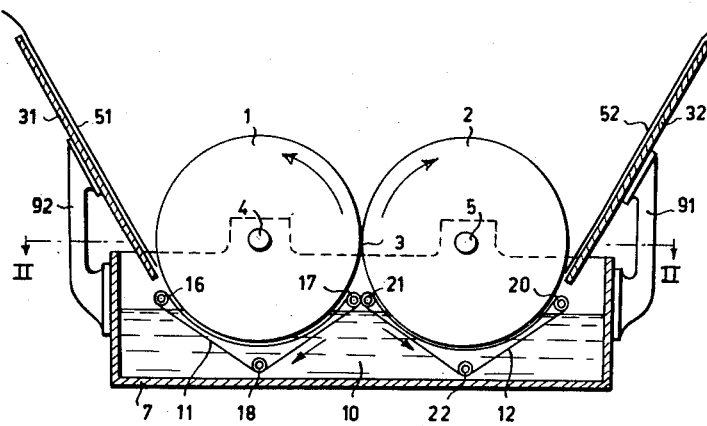
Figures 1, 4 and 9 are cross-sectional elevations of two embodiments in which both press rollers are immersed in a liquid reservoir.

Figure 1 shows a vertical cross-section of an apparatus according to the invention, in which two press rollers 1 and 2 are rotatable with their trunnions 4 and 5 in bearings which are mounted on the liquid reservoir 7. The distance between the axes of these bearings is adjusted so as to keep the rollers tightly pressed against each other, thus producing pressure in the pressing zone 3. Preferably the bearings are adjustable. One or both of the rollers may be rubber-lined. The rubber linings may, for example, have a hardness of 75 Shore. Both rollers constitute transport press rollers and both are immersed in the liquid reservoir 7, which is filled up to a suitable level with the liquid 10. The roller 1 co-operates with an endless belt system 11, which, as indicated by the arrow, travels along the lower surface of the roller 1 between the auxiliary rollers 16 and 17, and then turns into its return path via the auxiliary roller 18. In the same way the transport press roller 2 co-operates with the endless belt system 12, which travels with the roller between the auxiliary rollers 20 and 21 and returns via the auxiliary roller 22. Thus the two press rollers are arranged side by side and immersed in the liquid reservoir; both co-operate with an endless belt system, and the two belt systems terminate side by side underneath the pressing zone. A sheet 51, with that side directed downwards, which is to be used for the transfer, can be inserted, as indicated, along the table 31 into the gripping zone between the auxiliary roller 16 and the transport press roller 1, while simultaneously a sheet 52 also with that side downwards which is to be used for the transfer, can be inserted, as indicated, along the table 32 into the gripping zone between the auxiliary roller 20 and the transport press roller 2. The table 31 is secured to the reservoir 7 by means of a support 92, and in the same way the table 32 is mounted by means of the support 91.

Figure 2:
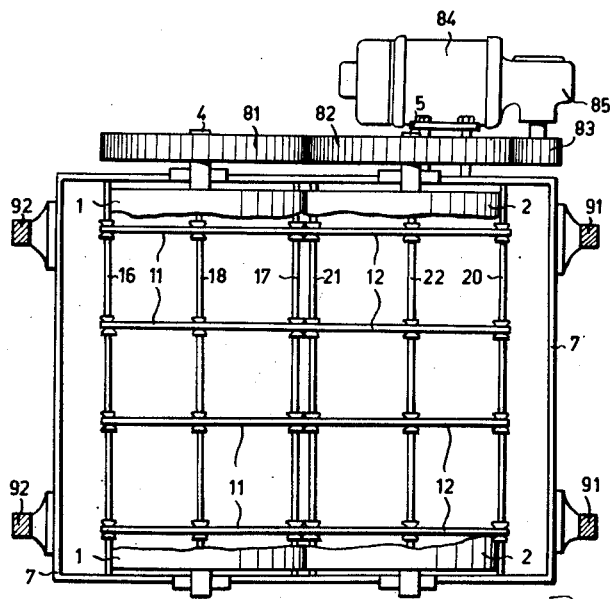
Figure 2 is a plan view of Figure 1, the press rollers being partly omitted for the sake of clearness.

Figure 2 is a plan view of the apparatus according to Figure 1 (partly in cross-section on the line II—II), showing the two endless belt systems of Figure 1 co-operating with the transport press rollers 1 and 2; for clarity, the rollers 1 and 2 are partly omitted in this figure. The endless belt systems consist of cords or ropes 11 and 12 of circular cross-section, and these will form little or no obstruction to the access of the liquid for moistening the sheets 51 and 52 when the latter are travelling in contact with them after having been inserted into the apparatus as described with reference to Figure 1.

On the shaft 4 of the roller 1 is mounted a toothed wheel 81 and on the shaft 5 of the roller 2 a toothed wheel 82, which are in engagement with each other. The apparatus is driven by an electric motor 84 via a reduction gear 85 provided with a pinion 83, so that the press roller 1 will move counterclockwise and the press roller 2 clockwise.

When the sheets 51 and 52 have been transported as far as the auxiliary rollers 17 and 21, and the endless belt systems 11 and 12 each turn into their own return path, the sheets will move with the rollers 1 and 2 upwards to the pressing zone 3. They will there be pressed together and then proceed further upwards as indicated by the arrow 56 in Figure 4. They can now be separated by hand and guided out of the apparatus. The hands pull the respective sheets 51 and 52 apart in the direction of the arrows 57 and 58 (Fig. 4).

Figure 4:
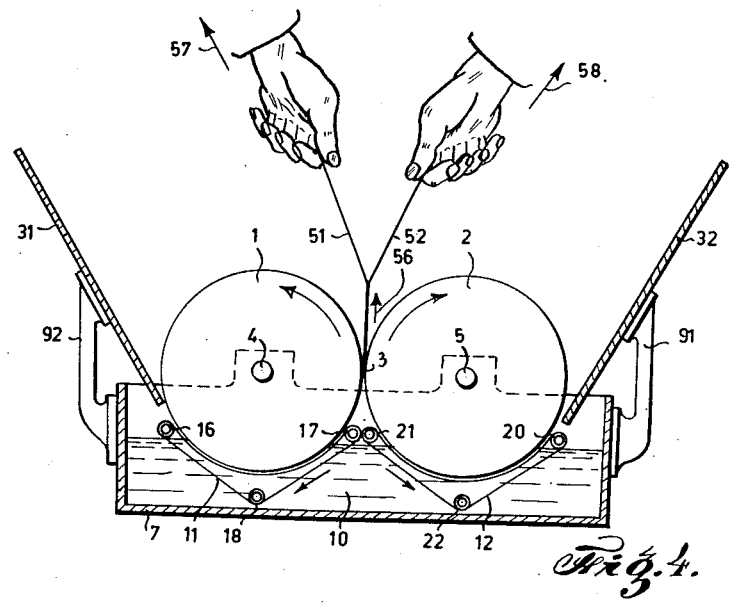

The apparatus may operate continuously, and whenever a transfer operation has to be carried out, sheets 51 and 52 simultaneously inserted as indicated in Figure 1, and shortly afterwards taken out and separated as indicated in Figure 4.

However, the apparatus may equally well be operated discontinuously. The sheets 51 and 52 are then inserted into the two gripping zones while the apparatus is still out of operation and subsequently the apparatus is started. The apparatus may be constructed to comprise means for arresting the transport press roller(s) after the latter have conveyed a predetermined length of material through the apparatus. This arrangement may be described with reference to Figure 4.

At a somewhat later moment in the cycle of operations than that illustrated in Figure 4, the two sheets will have left the pressing zone 3. At that moment the sheets will have covered a distance (calculated along the circumference of the press rollers) which is equal to the distance along the circumference of the roller 1 between the line of contact with the roller 16 and the pressing zone 3, plus the length of the compressed material.

After having covered this distance, the apparatus arrests itself. Devices for arresting are obvious and of the usual kind, but not shown. The apparatus can, for example, be driven by an electric motor driving either the roller 1 or the roller 2 or both, and this motor can be switched off by any suitable device actuating the electric switch of the motor after the apparatus has covered the above-mentioned distance. Thus, for example, the circumference of the rollers 1 and 2 may be chosen to be equal to or slightly larger than the said distance, and one of the rollers may carry an abutment which, when travelling past a tumbler-switch reverses this switch, this switch controlling the current supply to the driving motor.

In Figure 2 the belts 11 may be somewhat further apart on the shaft 17 than on the shaft 16, so that they may accommodate the expansion which the sheet undergoes in the direction transverse to the direction of movement during the liquid treatment when travelling from 16 to 17 underneath the roller 1. In the same way the belts 12 may be further apart on the shaft 21 than on the shaft 20.

The endless belt systems, as illustrated in Figure 2, constitute only one example of such systems. They naturally may consists of functionally equivalent means, provided these allow the liquid to act upon that surface of the sheet which is turned away from the press roller during its passage through the liquid. Thus, for example, suitable endless belt systems may consist of a network with meshes which are not too large, for example, a nylon net which is resistant to the liquid.

Figure 3:
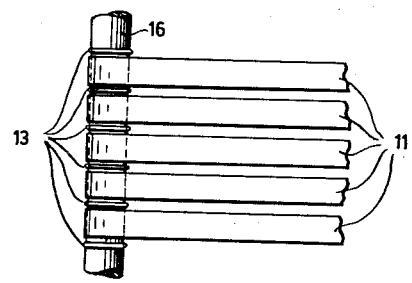
Figure 3 illustrates a system of belts for an endless belt system.

Another example of an endless belt system is illustrated in Figure 3. The belts 11 of rubber-impregnated duck, for example, have a width of 10 mm. and a thickness of 0.5 mm. They travel on the shaft 16, and are kept in track by flanges 13. If in the apparatus of Figure 2 use is made of these belts, flanges 13 are also desirable on, for example, the shaft 20, and they may also be mounted on the shafts 17, 18, 21 and 22. Preferably that surface of the belts which co-operates with the transport press roller is made uneven or porous; this promotes the access of the liquid to the sheet to be transported through the liquid reservoir. Low tension between belts and press roller likewise facilitates such access.

Separation immediately after the pressing together of the sheets as illustrated in Figure 4, is only applied in cases in which the transfer proper is substantially instantaneous, as is often the case in processes according to the aforesaid United States patent applications. In most diffusion transfer processes, such as those of Swiss patent specification No. 240,472, the sheets have to be left in contact with each other for some time, and in these cases they are seized with one hand instead of two, and are then separated at a later stage. As already stated, however, the apparatus according to the invention is not especially intended for such transfer processes.

Figure 5:
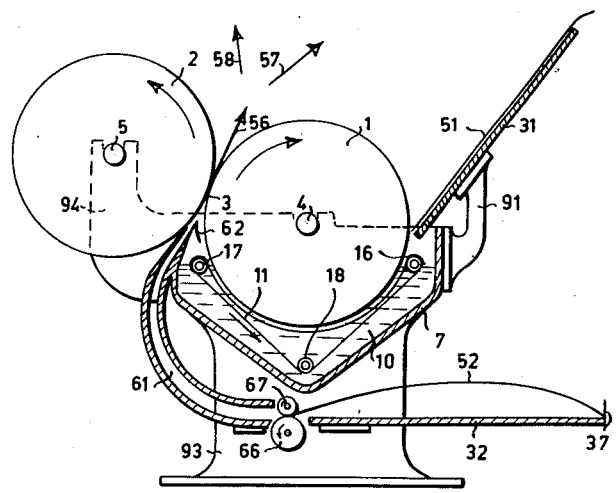
Figures 5, 6 and 8 illustrate three embodiments in which only one of the press rollers is immersed in the liquid reservoir.

Figure 5 illustrates an apparatus according to the invention comprising one press roller immersed in the liquid reservoir and co-operating there with the endless belt system for the transport of one sheet (sheet 51) through the liquid reservoir, a second press roller, not immersed in the liquid reservoir, and a conveying mechanism for conveying a sheet (sheet 52) to the pressing zone out of contact with the liquid. This conveying mechanism is denoted by the rollers 66 and 67, and the slot 61. The endless belt system consists of a number of metal chains laid side by side around the auxiliary rollers 16, 17 and 18. The auxiliary rollers 16 and 17 are provided with teeth which are in mesh with the openings of the chains. The two auxiliary rollers 16 and 17 are both driven at the same speed, but separately from the driving of the press rollers 1 and 2. The chains 11 will by their own weight hang free from the press roller 1. Near the lower end of the table 31 the conveying roller 23 is mounted in contact with the press roller 1. In apparatuses of this type the sheet 51 is treated with the liquid, whereas the sheet 52 is not so treated. This arrangement meets the requirements of a number of transfer processes, described in said United States patent applications. Assuming that the apparatus is running, and the rollers 1, 2, 23, 66 and 67 and the endless belt system 11 are travelling as indicated by the arrows, the sheets 51 and 52 are inserted simultaneously, the sheet 51 with that side, which co-operates in the transfer process directed downwards, via the table 31, and the sheet 52 with that side, which co-operates in the transfer process directed upwards, via the table 32. The sheet 51 will be gripped in the gripping zone between the rollers 1 and 23, and will be in contact with the liquid up to the slot 62, upon which it will pass through the said slot 62 to the pressing zone 3. In the meantime the sheet 52 will be transported by means of the rollers 66 and 67 through the slot 61 to the pressing zone. The speed of the conveying mechanism 66—67 is so chosen that the sheets 51 and 52 will be substantially in register when meeting in the pressing zone 3 in order to be pressed together. This means that the quotient of the length of the conveying path up to the pressing zone and the travelling speed should be substantially equal for the said transport press roller with conveying roller 23 and endless belt system as well as for the said conveying mechanism. Thus the leading edges of two sheets, when they start their movement at the same time, one on the transport press roller and the other in the conveying mechanism, will meet in register in the pressing zone. They subsequently proceed in the direction of the arrow 56, and can then be separated by hand, as diagrammatically indicated by the arrows 57 and 58. The simplest arrangement of course is one in which the rollers 66 and 67 have the same circumferential speed as the rollers 1 and 2. The two conveying paths should then have the same length. If for any reason the said conveying paths do not have equal length, the rollers 66 and 67 can be driven by means of a slip coupling, or these rollers may be so arranged that some slip will be possible between the rollers and the sheet 52. The rollers 66 and 67 may also be pulled apart at the very moment the leading edge of the sheet 52 enters the pressing zone 3. To prevent creases being formed in the sheet 52, it may be desirable to give the rollers 66 and 67 a circumferential speed of, for example, 9/10 of that of the press rollers, and to give the conveying path from the rollers 66, 67 to the pressing zone 3 a length of 9/10 of that between 11 and 3. The sheet 52 will then be stretched after its leading edge has entered the pressing zone.

Figure 6:
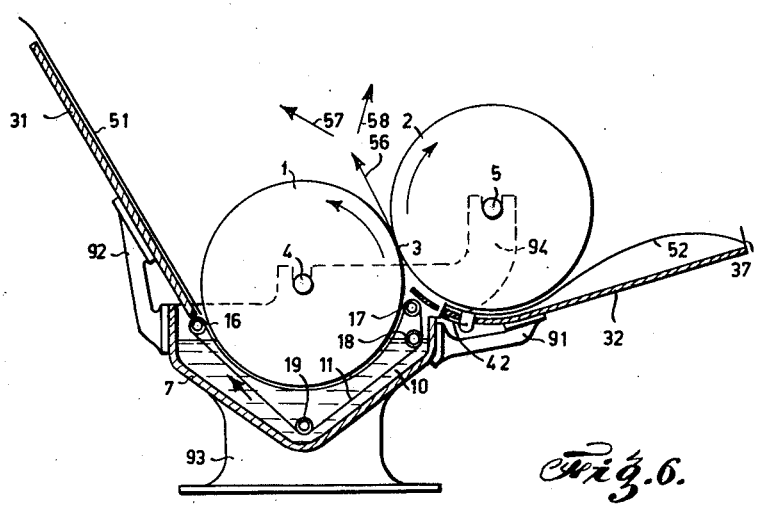
Figure 7:
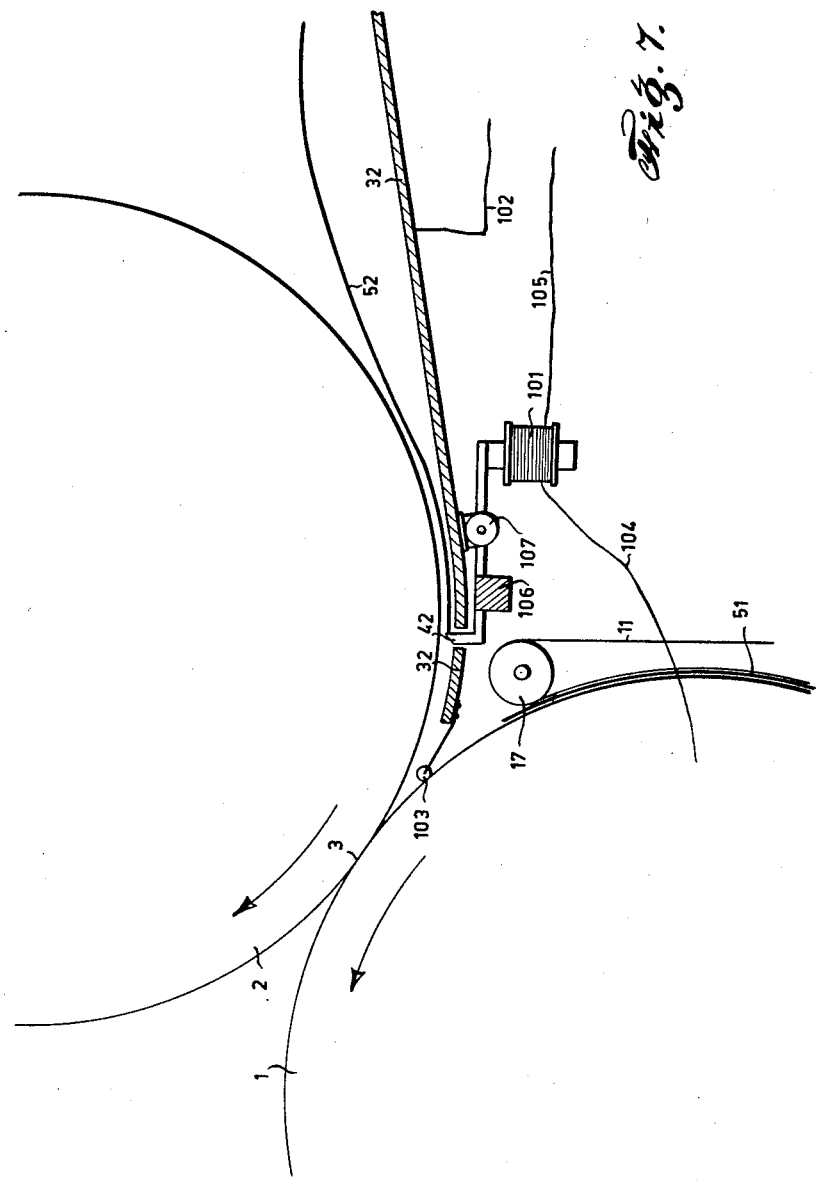
Figure 7 shows a detail of Figure 6 relating to the automatic actuating device.

The embodiment of the invention illustrated in Figure 6 again comprises one press roller immersed in the liquid reservoir and cooperating therein with the endless belt system for the transport of a sheet through the liquid reservoir, and a second press roller not immersed in the liquid reservoir. Further a mechanism is provided for holding a sheet in readiness and feeding it directly to the pressing zone, combined with means (compare Figure 7) for actuating this feeding mechanism, so as to bring the feeding in timed relation with the movement of the press roller-endless belt combination immersed in the liquid reservoir, when this combination conveys a sheet. In the apparatus of Figure 6 the sheet 52, with its active or cooperating side down, is held in readiness for feeding the pressing zone in clamped and bent-up position, the feeding mechanism being formed by the table 32, the abutment 42 and the flange 37 at the end of the table 32. The support 91 of the table 32 insulates the latter electrically from the reservoir 7 and from the bearings of the roller 1. The abutment 42 extends upwards through openings (not an uninterrupted slot) in the table 32. When the apparatus is operating continuously, the sheet 51, also with its active or cooperating side down, is inserted into the gripping zone between the rollers 1 and 16. It will be conveyed underneath the roller 1 through the liquid 10 to the roller 17, and will then proceed to the pressing zone 3, the endless belt system travelling in its return path via the auxiliary rollers 18 and 19 to the auxiliary roller 16. Meanwhile the abutment 42 will remain in the position illustrated in Figure 6, holding sheet 52. When, however, the leading edge of the sheet 51 approaches the pressing zone 3, then at a pre-selected moment the abutment 42 will be lowered, upon which the sheet 52, released from the clamped and bent-up position, will automatically insert its leading edge into the pressing zone 3, and will be gripped there and pressed together with the sheet 51. The compressed sheets will then follow a course indicated by the arrow 56, and upon separation the sheet 51 will follow the arrow 57 and the sheet 52 the arrow 58. The separation may again be effected by hand. After the apparatus has been stopped, the sheet 51 can be inserted into the gripping zone between the rollers 1 and 16, whilst the sheet 52 is placed in readiness in the feeding mechanism 32—37—42, upon which the apparatus can be started again. Numerous methods of actuating the feeding mechanism in timed relation with the transport of the sheet 51 by the press roller-endless belt combination are possible, one of which is illustrated by Figure 7. This figure represents a detail of Figure 6 on an enlarged scale. The table 32 is of metal, and at its end turned towards the pressing zone 3 it is provided with an extension plate spring carrying a small, rotatably mounted contact cylinder 103, which makes electric contact with the roller 1. An electric current passes through the conductor 102, the table 32, the contact 103, and the press roller 1. The current further passes through a sliding contact (not shown), through the conductor 104, through the electro-magnet 101, and then through the conductor 105. The magnet 101 is energized and pulls the rear end of the hook-shaped abutment 42, pivoting about the axis 107, into the position indicated in Figure 7. When the sheet 51, on its way to the pressing zone 3, passes underneath the contact roller 103, the electric circuit is interrupted or the current is at least weakened, so that the magnet 101 will no longer hold the abutment 42 in the raised position. This abutment 42 will descend under the influence of the weight 106, thus releasing the sheet 52, so that the latter, as described above, will shoot forward into the pressing zone 3 and will there be joined with the sheet 51. As soon as the sheets 51 and 52 have left the apparatus the contact between the contact roller 103 and the press roller 1 will be restored, and the abutment 42 will return to its original position, after which a fresh sheet 52 can be placed on the table 32 in clamped and bent-up position, and thus be held in readiness for the next transfer operation.

In the operation of the apparatus according to the invention it is not essential that the imagewise exposed material and the receiving support be separate sheets. One of them, preferably the receiving support, may have the character of a continuous web.

An embodiment of the apparatus according to the invention, which is particularly suitable for continuous operation, comprises one press roller immersed in the liquid reservoir and co-operating therein with the endless belt system for transporting a sheet through the liquid reservoir, a second press roller not immersed in the liquid reservoir, means for unreeling a web of material so that it may be passed along the second press roller and through the pressing zone, and finally means for winding up the web after its passage through the pressing zone.

Figure 8:
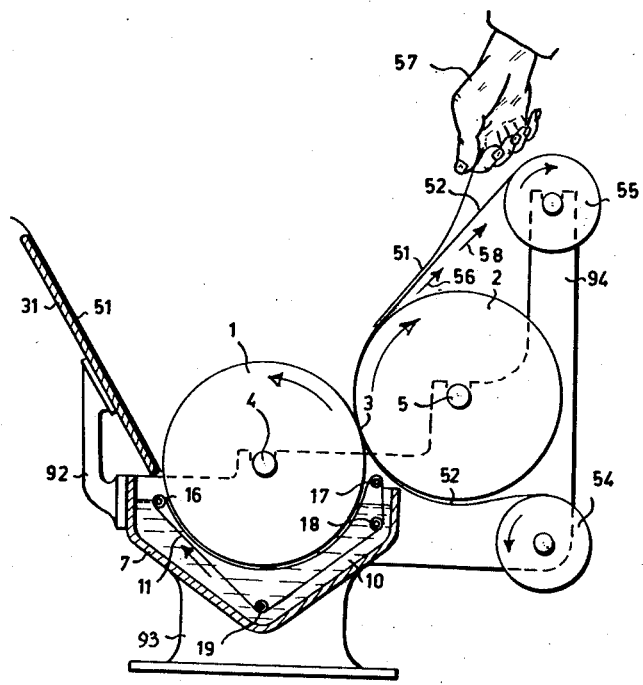

This embodiment is illustrated in Figure 8. The apparatus in this figure is intended to operate continuously, the press roller 2 continuously unreeling a reel 54 of receiving support material 52, which material, after having passed through the pressing zone 3, follows the arrow 56 to the reel 55, which is provided with means (not shown in the drawing) for winding it up, for example, with a slip coupling, which is driven from the other parts of the apparatus. Imagewise exposed sheets 51, with the image side down, are fed one after the other in succession along the table 31; they will be moistened by the liquid 10, proceed towards the pressing zone 3, where they are pressed together with the receiving support material 52, will adhere to the latter, and proceed in the direction of the arrow 56. They can be taken off by the hand 57. The web of receiving support material 52 will then carry in succession the transfer images from the imagewise exposed sheets 51, which have been fed through the apparatus one after the other. Before the web is wound on to the reel 55, the receiving support material 52 can be dried by obvious means (air current or radiant heat). When the reel 55 is unreeled, the transfer images can be cut from the web. As will be understood, the apparatus according to Figure 8 is particularly suitable for continuous production. It is not so well suited for the occasional production of a small number of transfer copies.

In the apparatus so far described, only one image transfer is achieved in each transfer operation.

There exist embodiments of the invention in which two different image transfers, e. g. on to both sides of one and the same receiving sheet, can be achieved in a single operation. In this case the two press rollers are each immersed in liquid reservoir and co-operate therein with an endless belt system. The two liquid reservoirs are spaced apart, and a conveying mechanism is provided for conveying a sheet upwards through the space between the liquid reservoirs to the pressing zone. Thus the apparatus has three paths along which sheets may travel, and the quotients of the lengths of the paths and the travelling speeds should be substantially equal for the three paths. Three sheets which have been fed in simultaneously will then meet in register with each other in the pressing zone.

Figure 9:
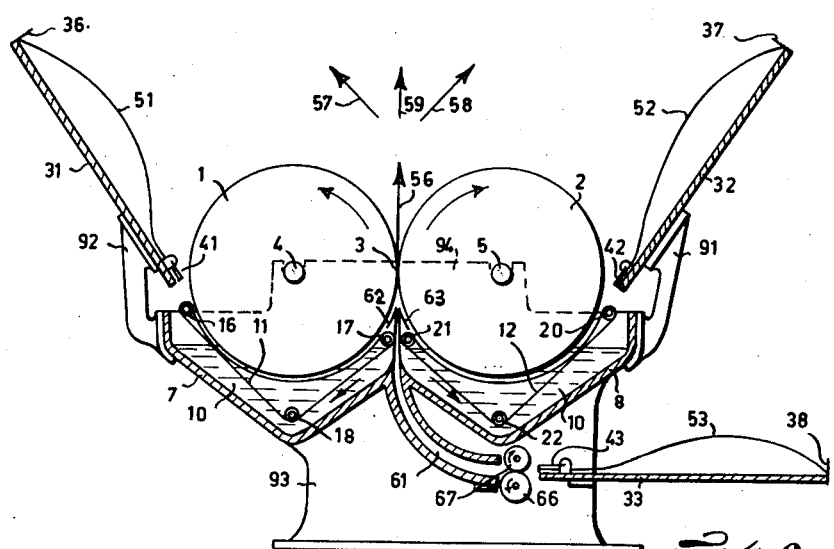

This embodiment is illustrated in Figure 9. The two liquid reservoirs are denoted by 7 and 8. They are both filled with liquid 10. Between the two liquid reservoirs there is a space for a slot 61, which together with the rollers 66 and 67 forms a conveying mechanism for conveying a sheet upwards to the pressing zone 3. The lengths of the paths from 16 to 3, from 20 to 3, and from 66—67 to 3 are equal, and the circumferential speed at which the rollers 66 and 67 rotate is the same as that of the press rollers 1 and 2.

The sheets 51 and 52 are two imagewise exposed sheets placed in readiness with their image side down (in feeding mechanisms, which will be described more in detail below) to be gripped between the endless belt system 11 and the press roller 1, and the endless belt system 12 and the press roller 2, respectively.

A receiving sheet 53, both sides of which are suitable for co-operating in the transfer, is held in readiness in a similar feeding mechanism, to be transported by the conveying mechanism formed by the rollers 66 and 67 and the slot 61.

When the apparatus is started, the endless belt system 11 will convey the sheet 51 along the lower side of the press roller 1 through the liquid, while the endless belt system 12 will convey the sheet 52 along the lower side of the press roller 2. Meanwhile the sheet 53 will be passed through the slot 61.

When the leading edges of the sheets 51 and 52 have travelled past the respective auxiliary rollers 17 and 21, they will follow the slots 62 and 63 respectively, and when they reach the pressing zone 3, the leading edge of the sheet 53 will be in between them. The three sheets will now be pressed together in the pressing zone 3; they will proceed upwards as indicated by the arrow 56, and can then be separated by three hands, as diagrammatically indicated by the arrows 57, 58 and 59. The receiving sheet 53, which follows the arrow 59, will carry a transfer image on each of its sides. The apparatus of Figure 9 may likewise be used for carrying out a double transfer in a single operation, if the sheet 53 is a sheet which is imagewise exposed on both sides, and if the sheets 51 and 52 are receiving sheets. The latter will then each carry one transfer image after the transfer operation.

An apparatus having only one liquid reservoir for both press rollers, but having underneath the pressing zone a passage or guideway for the third sheet, is of course an obvious equivalent of the apparatus according to Figure 9.

A further embodiment of the invention comprises a mechanism for holding in readiness and feeding to the gripping zone between the press roller immersed in the liquid reservoir and the endless belt system co-operating therewith, a sheet that is to be conveyed through the liquid. This construction is illustrated twice in Figure 9, this figure comprising two such feeding mechanisms. The feeding mechanism for the sheet 51 consists of a table 31 having a flange 36 at its end and an abutment 41, which can be lifted. The sheet 51 is clamped and bent up between the flange 36 and the lowered abutment 41. In the same way the sheet 52 is held in readiness for being fed by the feeding mechanism formed by the table 32 with the flange 37 and the abutment 42.

When the apparatus is equipped with a conveying mechanism for conveying a sheet to the pressing zone along a path not passing through the liquid reservoir, this apparatus may comprise a mechanism for holding a sheet in readiness and feeding it to the said conveying mechanism. Such a feeding mechanism is illustrated in Figure 9, and consists of a table 33 with a flange 38 and an abutment 43. In Figure 9 the sheet 53 is clamped and bent up between the flange 38 and the lowered abutment 43, and is thus held in readiness for being fed to the conveying mechanism consisting of the rollers 66—67 and the slot 61.

Assuming that the apparatus of Figure 9 has to run continuously then, upon the simultaneous retraction of the abutments 41, 42 and 43 the three sheets will shoot forward from their clamped and bent-up position, the sheet 51 into the gripping zone between the rollers 1 and 16, the sheet 52 into the gripping zone between the rollers 2 and 20, and the sheet 53 into the conveying mechanism 66—67. The sheets 51 will travel through the liquid underneath the roller 1 and through the slot 62, the sheet 52 underneath the roller 2 and through the slot 63, and the sheet 53 through the slot 61 to the pressing zone 3. There the three sheets will meet and be pressed together.

As soon as the three sheets are moving, fresh sheets may already be placed in readiness on the respective tables on top of the preceding sheets, even when the latter are still on their way, provided the abutments 41, 42 and 43 have meanwhile been re-positioned, so that they are in contact with the upper surfaces of the sheets sliding away underneath them.

In the operation of the apparatus according to the invention, either of the press rollers 1 and 2 or both may be driven. In a discontinuously operating apparatus, for example of the type of Figure 5, the roller 2 can be driven continuously and the roller 2 has to be lifted in order to arrest the roller 1. The conveying mechanism 66—67 may be coupled with the roller 1, and when therefore the roller 2 is lifted, the roller 1 as well as the conveying mechanism 66—67 will be arrested, while conversely, when the roller 2 is placed against the roller 1, this roller and the conveying mechanism will both be started.

The apparatus of Figures 1–4 may be used for carrying out the Examples II and III of Swiss patent specification No. 240,472, and also for carrying out Example II of United States patent application Serial No. 341,197 and and Example I of United States patent application Serial No. 341,198. In the latter cases the separation may be effected shortly after the pressing-together of the sheets, as shown in Figure 4. In carrying out the Examples II and III of Swiss patent specification No. 240,472 the sheets are left together for the time indicated in these examples, and they are subsequently separated.

The apparatus of Figures 5, 6 and 8 may be used inter alia for the purpose of carrying out various other examples of the above-mentioned United States patent applications, for instance, Example XXVIII of Serial No. 341,197 and Example IV of Serial No. 341,198, by using for the sheet 51 the imagewise exposed sheet with its image side down and for the sheet 52 the receiving sheet. In the same way Example XXI of Serial No. 341,197 and Example II of Serial No. 341,198 may be carried out in apparatus according to the Figures 5 and 6 by using for the sheet 51 the receiving sheet. In Figure 5 the sheet 52 is the imagewise exposed sheet with its image side up. In Figure 6 the sheet 52 is the imagewise exposed sheet with its image side down.

In the embodiments of the invention which comprise one or more mechanisms for holding a sheet in readiness and feeding it to the pressing zone (Figure 6) or to the conveying mechanism or gripping zone(s) (Figure 9), the feeding mechanisms may have the form of sheet-feeding devices holding a pile of sheets in stock and readiness. Many constructions of such sheet-feeding devices are known. There exists, for example, a device in which there is arranged over the pile of sheets a pushing member, which pushes the topmost sheet of the pile in the direction of either the conveying mechanism, the pressing zone or the gripping zone, and will thus bend up the topmost sheet each time in such a way that it will feed automatically into either the conveying mechanism, the pressing zone or the gripping zone, when an abutment, which prevents the topmost sheet from shooting forward, is withdrawn.

The provision of sheet-feeding devices may permit a considerable simplification in the operation of the apparatus in question.

When, for example, in the apparatus according to Figure 5, the table 32 with the flange 37 is replaced by a sheet-feeding device when carrying out transfer processes according to the above mentioned patent applications, the sheet 52 preferably constitutes the receiving sheet. When the press rollers 1 and 2 and the transport rollers 66 and 67 are running continuously, the abutment of the sheet-feeding device is actuated simultaneously with the feeding of the sheet 51 into the gripping zone between the rollers 1 and 16.

If the apparatus is running discontinuously, for example because it arrests itself, as described above, the sheet 51 may be placed in readiness with its leading edge in the gripping zone between the rollers 1 and 16, upon which the starting of the apparatus and the actuation of the abutment of the sheet-feeding device is made to take place simultaneously. Other applications of sheet-feeding devices for the replacement of the feeding tables of the drawings, will be possible and obvious to the expert.

What I claim:

1. An apparatus for carrying out a transfer process, comprising a pair of cooperating press rollers mounted with their surfaces contiguous to form a pressing zone through which a plurality of sheet materials may be passed together under pressure by rotation of said rollers, a reservoir for a transfer liquid, and separate means for conveying said sheet materials through separate paths into meeting relation at the entrance of said pressing zone, at least one of said conveying means comprising the surface of one of said press rollers, a portion of which ahead of said pressing zone is immersed in the liquid space of said reservoir, and an endless belt system having a belt flight extending adjacent to said immersed surface portion over its length in the direction of its rotation, said endless belt system terminating in front of the entrance of said pressing zone and travelling with the rotation of said surface, whereby said surface serves not only for pressing said sheet materials together but also to transport one of said materials into and through the transfer liquid and then into the pressing zone.

2. An apparatus as described in claim 1, said belt flight travelling in contact with said immersed surface portion.

3. An apparatus as described in claim 1, the angle between the tangent plane through said pressing zone and the horizontal plane being between 30° and 90°, so that the paths of said separate conveying means may be widely separated.

4. An apparatus for carrying out a transfer process, comprising a pair of cooperating press rollers mounted side by side with their surfaces contiguous to form a pressing zone through which a plurality of sheet materials may be passed together under pressure by rotation of said rollers, a reservoir for a transfer liquid, and separate means for conveying said materials through separate paths to said pressing zone, each of said press rollers forming a part of one of said conveying means, a portion of the surface of each press roller located below said pressing zone being immersed in the liquid space of a reservoir and associated with an endless belt system having a belt flight extending adjacent to said immersed surface portion over its length in the direction of its rotation, the two endless belt systems terminating side by side below the entrance of said pressing zone and travelling with the rotation of their respective press roller surfaces, whereby said surfaces serve to transport two of said sheet materials separately into and through the transfer liquid and then upwardly in meeting relation into the pressing zone.

5. An apparatus as described in claim 4, said separate conveying means including means for conveying a third sheet material upwardly to said pressing zone between the two endless belt systems.

6. An apparatus for carrying out a transfer process, comprising a pair of cooperating press rollers mounted with their surfaces contiguous to form a pressing zone through which a plurality of sheet materials may be passed together under pressure by rotation of said rollers, a reservoir for a transfer liquid, and separate means for conveying said materials through separate paths to said pressing zone, the path of one of said conveying means being isolated from the liquid space of said reservoir, another of said conveying means comprising the surface of one of said press rollers, a portion of which ahead of said pressing zone is immersed in said liquid space, and an endless belt system having a belt flight extending adjacent to said immersed surface portion over its length in the direction of its rotation, said endless belt system terminating in front of the entrance of said pressing zone and travelling with the rotation of said surface, whereby said surface will transport one of said sheet materials into and through the transfer liquid and then into the pressing zone in meeting relation to material conveyed thereinto by said one conveying means.

7. An apparatus as described in claim 6, the quotients of the respective lengths of the paths and the respective travelling speeds of the separate conveying means being approximately equal, so that the leading edges of sheets started simultaneously in said paths will meet in register in said pressing zone.

8. An apparatus as described in claim 1, said belt flight extending adjacent to said surface from a beginning location ahead of said liquid space, and a sheet holding and feeding mechanism arranged to deliver a sheet to said surface at that location.

9. An apparatus for carrying out a transfer process, comprising a pair of cooperating press rollers mounted with their surfaces contiguous to form a pressing zone through which a plurality of sheet materials may be passed together under pressure by rotation of said rollers, a reservoir for a transfer liquid, and separate means for conveying said sheet materials through separate paths into meeting relation at the entrance of said pressing zone, at least one of said conveying means comprising the surface of one of said press rollers, a portion of which ahead of said pressing zone is immersed in the liquid space of said reservoir, and an endless belt system having a belt flight extending adjacent to said immersed surface portion over its length in the direction of its rotation, said endless belt system terminating in front of the entrance of said pressing zone and travelling with the rotation of said surface, whereby said surface serves not only for pressing said sheet materials together but also to transport one of said materials into and through the transfer liquid and then into the pressing zone, a sheet holding and feeding mechanism arranged to deliver a sheet into said pressing zone out of contact with said liquid, and means for actuating said mechanism in timed relation to the movement of a sheet transported by said surface.

(References on following page)

References Cited in the file of this patent

UNITED STATES PATENTS

| | | |
|---|---|---|
| 1,757,950 | Allin | May 13, 1930 |
| 1,798,414 | Gronau | Mar. 13, 1930 |
| 2,605,684 | Nagels et al. | Aug. 5, 1952 |
| 2,657,618 | Eisbein | Nov. 3, 1953 |
| 2,688,333 | Lorig | Sept. 7, 1954 |

FOREIGN PATENTS

| | | |
|---|---|---|
| 298,965 | Great Britain | Oct. 13, 1928 |
| 311,509 | Great Britain | May 16, 1929 |
| 348,579 | Great Britain | May 13, 1931 |
| 879,995 | France | Dec. 10, 1942 |